Dec. 16, 1924.
C. N. BREIT
1,519,291
HEDGE CUTTER
Filed Nov. 15, 1921
2 Sheets-Sheet 2
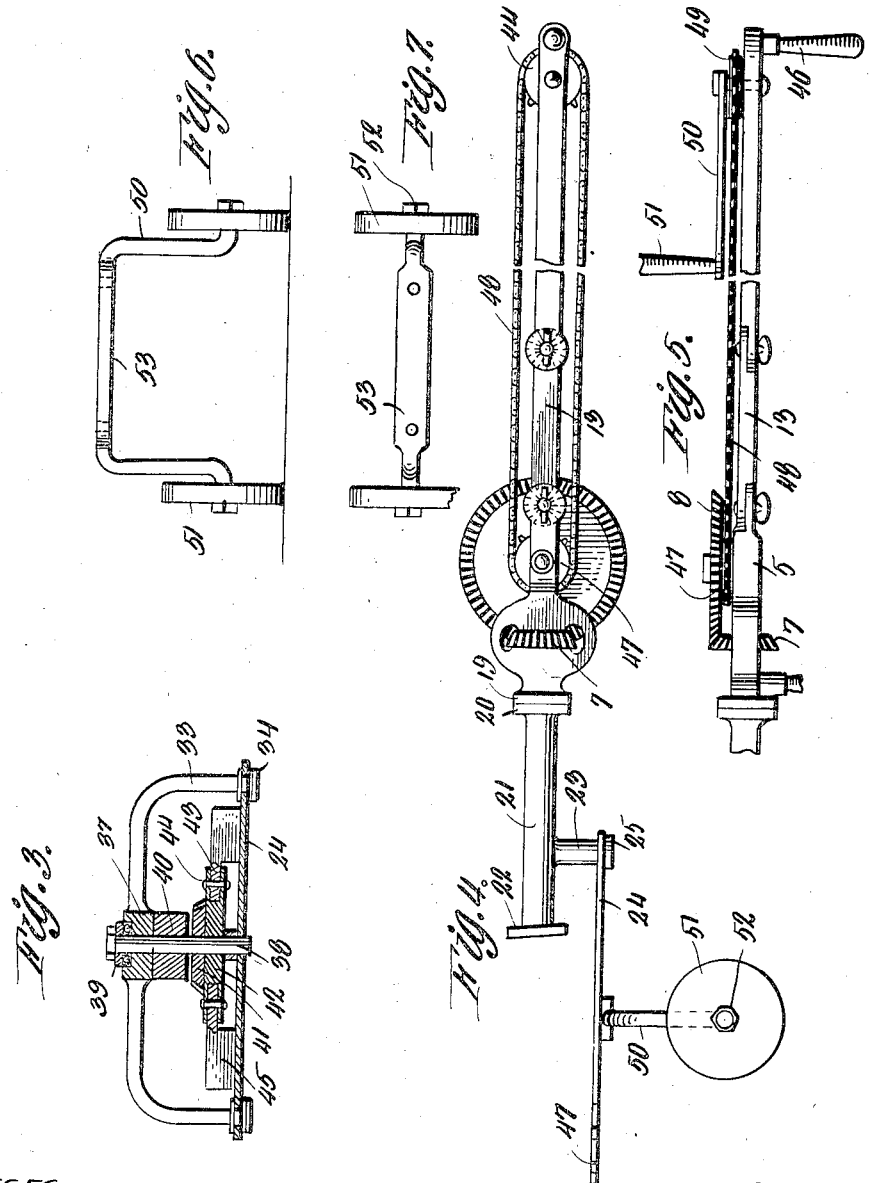
CARL N. BREIT, Inventor Patented Dec. 16, 1924.

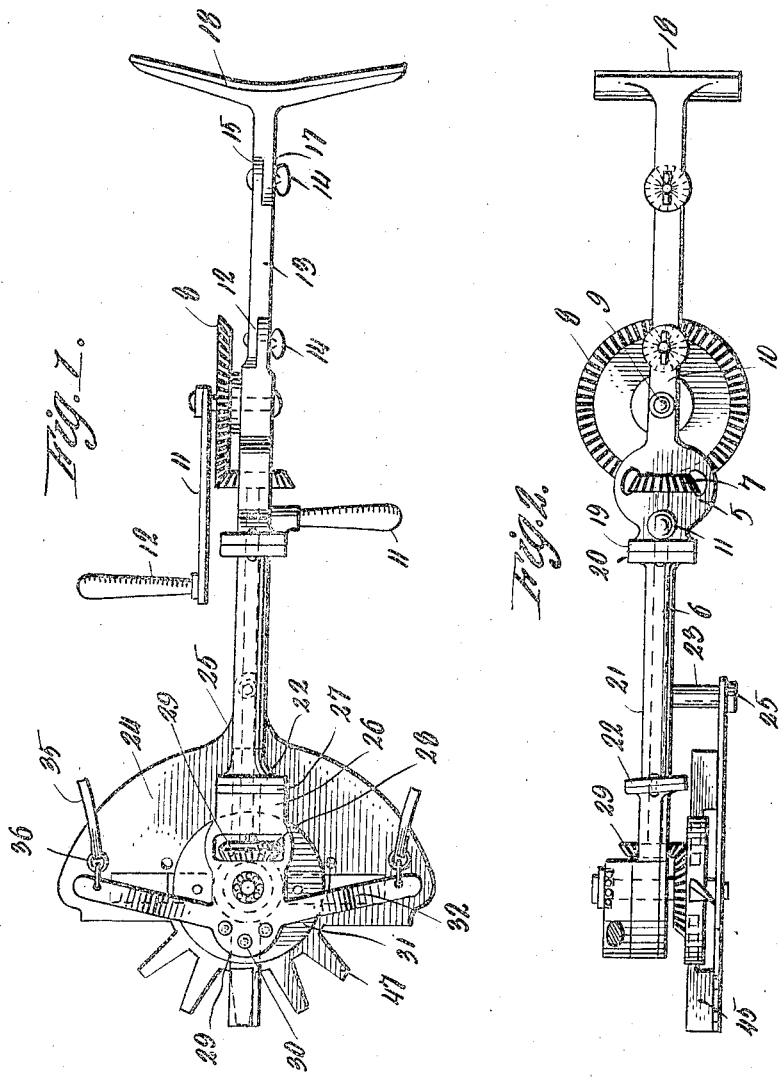

1,519,291

UNITED STATES PATENT OFFICE.

CARL NICHOLAS BREIT, OF LOUISVILLE, KENTUCKY.

HEDGE CUTTER.

Application filed November 15, 1921. Serial No. 515,348.

*To all whom it may concern:*

Be it known that I, CARL NICHOLAS BREIT, citizen of the United States, residing at Louisville, in the county of Jefferson and State of Kentucky, have invented certain new and useful Improvements in Hedge Cutters, of which the following is a specification.

This invention relates to hedge or lawn trimming devices and has for its object to provide a portable or wheel supported mechanism for cutting and trimming a hedge with facility and ease and dispensing with the use of clippers, hand shears or other similar cutters.

The primary object of the invention is to construct a hedge trimming mechanism to be carried by one person, or movable on supporting wheels including a manually operable crank handle and gearing, whereby the cutting knives will produce a shearing action with respect to stationary fingers engaging the hedge to be cut.

Another and very important object of the invention is the construction of a hedge trimming machine of the character above set forth which can be converted from a portable to a wheel supported device to permit of the cutting of hedges in and about trees or other lawn or garden plants.

A further and very important object of the invention resides in a cutting mechanism, wherein accuracy and precision is desired in trimming and cutting hedges or plants, and one in which the parts are extremely simple in construction, easily assembled, highly efficient in operation, practical, durable, and otherwise capable of being manufactured at a very low cost, whereby its commercial possibilities are greatly enhanced.

The invention will be best understood from a consideration of the following detailed description taken in connection with the accompanying drawing forming a part of this specification, with the understanding, however, that the invention is not confined to any strict conformity with the showing in the drawing, but may be changed and modified so long as such changes and modifications mark no material departure from the salient features of the invention as expressed in the subject matter being claimed.

I attain these objects and others in the accompanying drawings, wherein

Figure 1 is a side view of the trimmer.

Figure 2 is a plan.

Figure 3 is a vertical section showing the relation of the shearing plate with the cutting knives.

Figure 4 is a modified form of the invention showing the same as applied to a wheel supported structure.

Figure 5 is a plan view of the modified form.

Figure 6 is a front view of the supporting wheels for the stationary plate; and

Figure 7 is a plan view of the supporting wheels.

Referring now to the drawings wherein like reference characters designate corresponding parts throughout the several views, reference being had in particular to Figures 1 and 2, 5 designates a frame, through which one end of a rotatable shaft 6 extends, said shaft having a beveled gear 7 operable within the frame and meshing with a large beveled gear 8, mounted for rotation on the shaft 9 of the extension 10, formed integral with the same. A lever 11 and handle 12 is provided to rotate the beveled gear 8, whereby power is communicated to the shaft 6, as clearly understood, a transversely extending handle 11 being provided on the frame, whereby the mechanism may be properly supported and held to the work. One end of the housing is provided with a reduced, serrated end for cooperation with the serrated portion 12 of an extension bar 13, the usual thumb nut 14 securing said serrated members in position, whereby the extension bar may be adjusted with respect to the housing above referred to. A similar serrated connection is had between the opposite end 15 of the extension bar and the reduced end 17 of a body engaging plate 18, it being readily apparent that said plate is also adapted for adjustment with respect to the extension bar to meet the convenience of the operator.

The opposite end of the frame is provided with a flange 19 for connection with the flanged portion 20 of the shaft housing 21, which housing is provided with a corresponding flange 22 at its opposite end and a stud 23 for connection with the substantially semi-circular shearing plate 24, as clearly shown by Figure 1 of the drawing. The reduced extension 25 of the shearing plate fits over the stud and is adapted for adjustment by the adjusting nut 25, whereby the said plate may be moved to and from the rotatable cutting mechanism, subsequently to be referred to.

A secondary gear frame 26 having a flanged portion 27 for connection with the flange 22 of the shaft housing, is provided with an aperture 28 therein for the reception of a beveled gear 29 mounted for rotation with the shaft 6, heretofore referred to. The said last mentioned frame 26 is also provided with a front curved plate portion 29, having adjusting nuts 30 for connection with the circular plate 31, it being observed that the said housing is provided with extension arms 32, angularly disposed with respect to the longitudinal axis of the shaft and have their curved ends 33 secured by nuts 34 to the shearing plate 24, above referred to. Shoulder straps 35 are provided with a ring and link connection 36 attached to the respective arms so that the cutter may be conveniently supported from the body of the person operating the device.

Extending through the enlarged, central portion 37 of the housing and between the respective arms there is provided a spindle 38, having the usual bearings 39 at its upper end and a spacing collar 40 interposed between the said portion 37 and a beveled gear 41, which meshes with the beveled gear 29. The said beveled gear 41 is formed preferably integral with a circular plate 42 provided with slots therein for the reception of the reduced extension 43 secured therein by suitable fastening elements 44 whereby the tapered shearing knives or blades 45 cooperate with the stationary shearing plate, above referred to. It will thus be seen that upon the rotation of the shaft 6, through the gearing above described, that the knives 45 will pass over the fingers 47 formed on the outer edge of the plate 24 and thus the shearing or cutting action of the stems of the hedge engaged by the fingers will sever the same, as is well understood. The adjusting nuts 30 and the adjusting nuts 34 permit of the proper separation of the stationary plate with respect to the cutting knives so as to regulate the proper cut desired. Moreover it will be seen that the relation of the flanges on the respective gear frames and the shaft housing permit of the adjustability of the same so that the cutting mechanism may be disposed at various angular relations with respect to the body portion of the cutting mechanism so that the same can be presented to the work without moving the extension bar or the body plate.

Referring now to the form of the invention shown by Figures 4 and 5 of the drawing in particular, it will be observed that the gear frame and extension bar 5 and 13 respectively are similarly connected, as shown by Figures 1 and 2 of the drawing, but that in this instance the handle 46 is secured at one end of the device. The beveled gear 8 in this form of the invention is provided with a sprocket 47 and sprocket chain 48 trained over a second sprocket 49 adjacent the handle 46 and operable by the lever 50 and handle 51. To the stud 23 of the shaft housing 21 the mechanism is adapted for attachment to the roller supporting structure comprising the U-shaped axle 50, having the ground supporting wheels 51 secured by suitable nuts or other fastening elements 52 on the spindles of said axle. A top attaching plate 53 is adapted for connection to the shearing plate 24 of the mechanism, whereby the housing 26 and the rotatable plate 31 and its cutters 45 may be mounted for cooperation therewith.

It will thus be seen that the device lends itself to be either carried by the person of the operator or in those instances where it is desired to mount the same on the wheel supporting structure, above described, that the sprocket and chain gearing may be resorted to in order to effectively operate the cutting mechanism.

In the accompanying drawings, I have illustrated my invention embodied in one form by way of example, and which in practice has been found to be highly satisfactory in obtaining the desired results. It will be obvious however, that other embodiments may be adapted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having thus described and illustrated my invention, what I claim as new and desire to secure by Letters Patent is:

1. In a trimmer, a frame, a cutter carried by the frame, means for operating the cutter, an extension bar pivotally secured to the rear end of the frame, means for adjustably holding the extension bar in position, a second extension bar pivotally secured to the rear end of the first extension bar, means adjustably holding the second mentioned bar in position, as and for the purpose specified.

2. In a hedge trimmer, a frame, a flat substantially semicircular supporting plate carried by the forward end of the frame having its straight edge disposed forwardmost and provided with a cutting surface, radially extending forwardly projecting cutting fingers rigidly carried by the forward edge of the plate, a rotatable cutter carried by the plate having cutting knives operating over one surface of the plate and the cutting fingers, means for operating the rotary cutter from the frame, rigid radially extending supporting arms carried by the frame, and a supporting device connected with said arms.

In testimony whereof I affix my signature in presence of two witnesses.

CARL NICHOLAS BREIT.

Witnesses:
C. F. KAMPSCHAEFER,
CARL LEO BREIT.